Patented Jan. 24, 1933

1,895,354

UNITED STATES PATENT OFFICE

GEORGE F. TAYLOR, OF SCHENECTADY, NEW YORK, ASSIGNOR TO GENERAL ELECTRIC COMPANY, A CORPORATION OF NEW YORK

RESINTERED HARD METAL COMPOSITION

No Drawing.  Application filed October 23, 1929.  Serial No. 401,977.

The present invention relates to sintered hard metal compositions of the character disclosed in the U. S. Patents to Schroter #1,549,615 and 1,721,416. Compositions of this character, in general, consist of a carbide of an element of the 6th group of Mendelejeff's periodic table, such as tungsten carbide, and an auxiliary binding or cementing metal of the iron group, such as cobalt. The carbide and cobalt are ordinarily mixed in powdered form, pressed into a desired shape under high pressure and heated to the sintering temperature of the mixture. This temperature is ordinarily about 1350° C. but may vary with the quantity of auxiliary metal present in the composition. The material produced by this process is a hard tough metal composition which is particularly suitable for use as a metal cutting tool or wire drawing die.

It is one of the objects of the present invention to provide an improved product of this type having a very fine grain structure and great density. Such a material may be used to advantage not only as a metal cutting tool but also in the production of diamond impregnated abrading tools and dense rods or wires of small diameter.

In carrying out my invention, a powdered carbide of an element of the 6th group of Mendelejeff's periodic table such as tungsten carbide and an element of the iron group such as cobalt are mixed together in suitable proportions, formed into a compact mass under pressure and heated to the sintering temperature of the mixture, as disclosed in Schroter Patent No. 1,549,615, or in the copending application of Samuel L. Hoyt, Serial No. 181,536, filed April 6, 1927, now Patent No. 1,843,768 forming a very hard solid and tough metal composition. The sintered product thus formed is then crushed or broken up into particles having approximately the size of wheat grains, a pressure of about 175 tons per square inch being employed for that purpose. This crushed material is pulverized to such a fineness that it will float in alcohol for about five minutes and then pressed into any desired shape and resintered at a temperature above 1000° C., for example a temperature of about 1380° C. The pressing and resintering operations may be carried out successively or simultaneously as desired. When the product is formed by the simultaneous application of heat and pressure, I have found that a pressure of about 4000 lbs. per square inch applied for a few minutes and a sintering temperature of about 1400° C. produce very satisfactory results with powdered material consisting of about 87% tungsten carbide and 13% cobalt.

It is of course highly desirable to prevent contamination of the pulverized material with any foreign matter. The sintered material of grain size should therefore be pulverized by employing a mortar and pestle made of very hard material such as sintered tungsten carbide and cobalt or pulverized in a ball mill lined with a sintered composition of tungsten carbide and cobalt and employing as the ball material relatively large pieces of a similar sintered composition.

The material produced by my improved process has a light, lustrous appearance and the grain structure is very fine, substantially no pores being observed under a magnification of 450 diameters. When the pulverized sintered material is pressed and then resintered the resulting material has a hardness number of about 87 to 91 on the Rockwell C scale with 60 kilogram load.

A fused product consisting of tungsten carbide and cobalt may also be pulverized to a fineness such that it will float on alcohol for about five minutes and then sintered. However, I have found that the resulting product while very hard and showing a fine grain structure, has far less strength than a similar composition which has first been sintered, then pulverized to a fineness such that it will float on alcohol for about five minutes and then resintered. Material which has been fused, pulverized and then sintered and contains about 87% tungsten carbide and 13% tungsten cobalt has a hardness number of about 84 on the Rockwell C scale with a 60 kilogram load.

It is my opinion that the fine grain, dense product produced by my resintering process is due to the fact that a sintered composition of tungsten carbide and cobalt may be ground more finely than a mixture of tungsten carbide and cobalt powders which has not been sintered. When the powdered mixture has been sintered there is no further evolution of gases when the product is pulverized and resintered and therefore, since gas pockets do not occur, the resulting product is very dense.

While resintered tungsten carbide and cobalt makes a very desirable metal cutting tool, I have found that the resintered material is also particularly desirable as a matrix for very fine diamond powder in the manufacture of cutting or abrading tools.

In my copending application, Serial No. 357,536, filed April 23, 1929, I have disclosed a cutting or abrasive tool consisting of tungsten carbide and cobalt impregnated with diamond dust. In the production of tools by the process described in my prior application, it is usual to employ diamond dust which will pass a mesh of about 40 to about 100 since hitherto more satisfactory drills have been obtained with diamond dust of that degree of fineness rather than with extremely fine diamond dust, such for example as No. 6, which is known commercially as the finest form of diamond dust normally obtainable. I have found however that if a hard tough mass of sintered tungsten carbide and cobalt is pulverized so that the pulverized material will float on alcohol for about five minutes, this powdered material may be impregnated or charged with very fine diamond dust such as that commercially known as No. 6 diamond dust and the mixture pressed into a desired form and heated to its sintering temperature. The mixed materials may be pressed and then sintered although I prefer to press and sinter the materials simultaneously. In the latter case I employ a pressure of about 4000 pounds per square inch which is applied for about one minute, and a temperature above 1000° C. but usually well below 1400° C. The resulting product is stronger and harder than the product obtained when coarser diamond dust is used. It has a smooth uniform fracture and is practically insoluble even in nitro-hydrofluoride acid. It is my belief that this product could be used if desired as a lathe tool, drill or wire drawing die. The proportions of materials employed in the composition may be about 3½ parts tungsten carbide and cobalt to one part by volume diamond dust, or, in other words, about one part by weight of diamond dust to 10 to 13 parts by weight of tungsten carbide and cobalt. In the composition, the diamond dust has approximately the same degree of fineness as the pulverized sintered tungsten carbide and cobalt.

A resintered composition of tungsten carbide and cobalt may also be employed to advantage in producing relatively small rods or wires of this composition, for example rods or wires varying from about a few mils to ⅛" in diameter. In making such rods, a sintered composition of tungsten carbide and cobalt in powdered form may be placed in a quartz tube of suitable diameter and bore, and pressure applied by means of tungsten or molybdenum plungers inserted at opposite ends of the bore, current being simultaneously applied to the powdered materials through the plungers as in Hoyt Patent No. 1,843,768. The pressure applied may be very slight, for example only a few pounds per square inch. Application of a heating current of about 75 amperes at about 4 to 6 volts for a few seconds only, completes the sintering operation. Rods or wires made in this manner from a sintered powdered composition of tungsten carbide and cobalt are very hard and non-porous and may be used as phonograph needles and as cutting styli for phonograph records.

A small rod or wire made in the manner above described from a mixture of tungsten carbide and cobalt powders which have not been previously sintered is somewhat porous apparently because gas is evolved during the sintering of the tungsten carbide and cobalt, and the microscopic gas bubbles cannot escape in the short time during which the powdered material is heated to its sintering temperature. Where sintered, powdered material is employed no gas is evolved on resintering and pressing the material.

There is a further advantage in using sintered, pulverized material to make small wires due to the fact that when an unsintered mixture of tungsten carbide and cobalt powders is employed, it is very difficult to secure electrical contact through the small diameter powdered material in the quartz tube. The resistance under such conditions may be measured in megohms through 1" of compressed powders about 60 mils in diameter. While it is possible by special treatment to reduce this resistance to about 200 ohms the electrical contact obtained is uncertain and variable. When sintered powdered material is employed however, the resistance is relatively small, for example about 1 ohm and electrical contact is certain.

The above process for making small wires or rods of resintered tungsten carbide and cobalt may be employed to advantage in the manufacture of small drilling tools and the like, consisting of tungsten carbide and cobalt impregnated with diamond dust. For example, fine diamond dust may be mixed with a sintered pulverized composition of tungsten carbide and cobalt in the proportions heretofore recited in the present specification and placed in a quartz tube of suitable bore and diameter. Tungsten or preferably molybdenum plungers, are inserted in the opposite ends of the bore and a slight pressure applied to the powdered materials while a current of about 75 amperes at 4 to 6 volts is supplied to the mixed powdered materials for a few seconds to resinter them. The molybdenum plungers are joined during the resintering operation to the opposite ends of the diamond charged material. The rod of resintered material may be broken intermediate its ends to provide two drills, the work or cutting portions of which consist of a matrix of resintered tungsten carbide and cobalt impregnated or charged with fine diamond particles.

What I claim as new and desire to secure by Letters Patent of the United States, is:

1. The method of manufacturing a hard, tough, metal composition from powdered materials consisting largely of a carbide of an element of the 6th group of Mendelejeff's periodic table but containing an appreciable amount of a metal of the iron group which comprises pressing and sintering the powdered materials to form a hard, solid mass, pulverizing said mass and pressing and sintering the pulverized material.

2. The method of manufacturing a hard, tough, metal composition from powdered materials consisting largely of tungsten carbide but containing an appreciable amount of cobalt which comprises pressing and sintering the powdered materials to form a hard, solid mass, pulverizing said mass and pressing and sintering the pulverized material.

3. The method of manufacturing a hard, tough, metal composition from powdered materials consisting largely of tungsten but containing appreciable amounts of carbon and cobalt, which comprises pressing and sintering the powdered materials to form a hard, solid mass, pulverizing said mass to a degree of fineness such that it will float on alcohol for a few minutes, and pressing and sintering the pulverized material.

4. The method of manufacturing a hard, tough, metal composition which comprises pulverizing a hard, solid mass consisting substantially of tungsten carbide and cobalt, adding a diamond powder to said pulverized mass and pressing and sintering the mixed materials.

5. The method of manufacturing a hard, tough, metal composition from powdered materials consisting largely of a carbide of an element of the 6th group of Mendelejeff's periodic table and a metal of the iron group which comprises pressing and sintering the powdered materials to form a hard, solid mass, pulverizing said mass, adding powdered abrasive material to said mass and pressing and sintering the mixed materials.

6. The method of manufacturing a hard, tough, metal composition from powdered materials consisting largely of tungsten carbide but containing an appreciable amount of cobalt which comprises pressing and sintering the powdered materials to form a hard, solid mass, pulverizing said mass, adding an abrasive material to said mass, and pressing and sintering the mixed materials.

7. The method of forming a hard, tough, metal composition from powdered materials consisting largely of tungsten carbide but containing an appreciable amount of cobalt which comprises pressing and sintering the powdered materials to form a hard, solid mass, pulverizing said mass to a degree of fineness such that it will float on alcohol for a few minutes, adding an appreciable amount of abrasive material having substantially the same degree of fineness as said pulverized material and pressing and sintering the mixed materials.

8. The method of forming a hard, tough metal composition from powdered materials consisting largely of tungsten carbide but containing an appreciable amount of cobalt which comprises pressing and sintering the powdered materials to form a hard, solid mass, pulverizing said mass to a degree of fineness such that it will float on alcohol for a few minutes, adding an appreciable amount of diamond powder having substantially the same degree of fineness as said pulverized material and pressing and sintering the mixed materials.

9. The method of forming a hard metal composition which comprises placing in a mold pieces of a sintered composition consisting largely of tungsten carbide and containing appreciable but minor quantities of a metal of the iron group, applying pressure thereto and simultaneously heating said composition to its sintering temperature to thereby form said composition into a hard, dense mass.

In witness whereof, I have hereunto set my hand this 22nd day of October 1929.

GEORGE F. TAYLOR.